United States Patent [19]

Hochstetter

[11] Patent Number: 4,806,781
[45] Date of Patent: Feb. 21, 1989

[54] WATER-DRIVEN MACHINE SET WITH THE SPEED REFERENCE VALUE SET FOR OPTIMUM EFFICIENCY

[75] Inventor: Werner Hochstetter, Erlangen, Fed. Rep. of Germany

[73] Assignee: Siemens Aktiengesellschaft, Berlin and Munich, Fed. Rep. of Germany

[21] Appl. No.: 197

[22] Filed: Jan. 2, 1987

[30] Foreign Application Priority Data

Jan. 17, 1986 [DE] Fed. Rep. of Germany ....... 3601288

[51] Int. Cl.$^4$ ............................................. F03B 15/02
[52] U.S. Cl. ........................................ 290/43; 290/52
[58] Field of Search ............................... 290/43, 52, 54

[56] References Cited

U.S. PATENT DOCUMENTS

| | | | |
|---|---|---|---|
| 4,367,890 | 1/1983 | Spirk | 290/52 |
| 4,400,659 | 8/1983 | Barron et al. | 322/32 |
| 4,475,334 | 10/1984 | Kuwabara | 290/43 X |
| 4,533,835 | 8/1985 | Beckwith | 290/43 |
| 4,641,040 | 2/1987 | Megnint | 290/52 |
| 4,674,279 | 6/1987 | Ali et al. | 290/52 X |

FOREIGN PATENT DOCUMENTS 3005375 8/1981 Fed. Rep. of Germany .

Primary Examiner—William M. Shoop, Jr.
Assistant Examiner—W. E. Duncanson, Jr.
Attorney, Agent, or Firm—Kenyon & Kenyon

[57] ABSTRACT

A machine set (1) consists of a water-driven turbine (11) and a generator (12) coupled thereto. The generator feeds a network of constant frequency (3) via a frequency-controlled converter (2). The speed reference value ($n^*$) of the machine set is given by means simulating turbine characteristics (4) in dependence on two characteristic quantities ($a_o$ or $\Phi$) with optimum efficiency and is finely optimized (n) preferably by a maximum power-point control (5). The upper and lower water level ($L_u$, $L_H$) can be preset, in a single or double-action controlled turbine (11) additionally by a control device (6) if one of the two characteristic quantities ($a_o$ or $\Phi$, respectively) is used as a control signal for the nozzle orifice or the aperture at the guide wheel or rotor. Advantageously, in the case of the double-controlled turbine, the characteristic quantity not needed for the level control is slaved as a further control signal with the optimum efficiency, and the characteristic quantity used for the level control is limited.

10 Claims, 3 Drawing Sheets

WATER-DRIVEN MACHINE SET WITH THE SPEED REFERENCE VALUE SET FOR OPTIMUM EFFICIENCY

BACKGROUND OF THE INVENTION (a) Field of Invention

The invention relates to a machine set consisting of a water turbine and a permanently coupled generator which feeds an electric network of constant frequency via a frequency-controlled converter, wherein the speed of the machine set can be adjusted so that an optimum amount of active power is delivered with maximum efficiency.

(b) Description of the Prior Art

An arrangement of this kind is known from German Pat. No. 3 005 375. In this reference, a propeller turbine with nonadjustable rotor blades, through which water flows, is coupled to a generator. The speed of this turbo set is adjusted in a given speed range via a frequency-controlled converter. Such an arrangement makes it possible to design the generator for a nominal frequency which is lower than the network frequency. Thus, the turbo set in the reference may be operated at a frequency of less than 20 Hz at the generator terminals. Thereby, noticeably lower a-c losses occur which can be taken into account in the construction of the generator especially by an increase of the power factor. Since the power output is now controlled by presetting the turbine speed on the electrical side, the control through the mechanical adjustment of the rotor blades, previously used for this purpose, can be eliminated. However, no disclosure can be found in the patent as to how a device for setting the corresponding speed reference value required therefor is designed in practice.

SUMMARY OF THE INVENTION

It is an object of the present invention, on the other hand, to describe such a device in concrete terms, which can also be used universally for all possible types at the turbines. It should be possible to preset the speed reference value of the machine set by a reference generator in such a manner that maximum efficiency is always obtained, taking into consideration the actual conditions relating to the operating point of the turbine and the hydraulic conditions. It should further be possible to adjust by additional level control, the upper or lower water level likewise with the boundary condition of the maximally possible efficiency in the desired manner.

The problem is solved by means which simulate turbine characteristics and preset a speed reference value as a function of the actual drop and of two turbine characteristics quantities, namely the apertures of the guide vane and rotor blade group or, in the case of Pelton turbines, the orifice of the nozzles and the rotor blade group.

It is particularly advantageous if a maximum power-point control (MPP-control) evaluating an actual active-power value varies the speed reference value by successively adding incremental correcting values until optimum active power is delivered to the network.

In a machine set with a single-or-double-action controlled turbine, a control device for setting a desired upper or lower water level presets preferably one of the characteristic quantities as the control signal.

In the case of a double-action-controlled turbine, it is of special advantage here if a characteristic generator slaves the characteristic quantity not preset by the level control as a function of the actual speed of the machine set for optimum efficiency, to the other characteristic.

Non-permissible operating conditions are avoided in particular by the provision that a limiter limits the characteristic quantity serving as the control signal for regulating the water level as a function of the actual speed of the machine set and the water drop.

BRIEF DESCRIPTION OF THE DRAWINGS

The invention will be explained in greater detail in the following, making reference to the figures listed below, wherein.

DETAILED DESCRIPTION OF THE INVENTION

Figure 1:
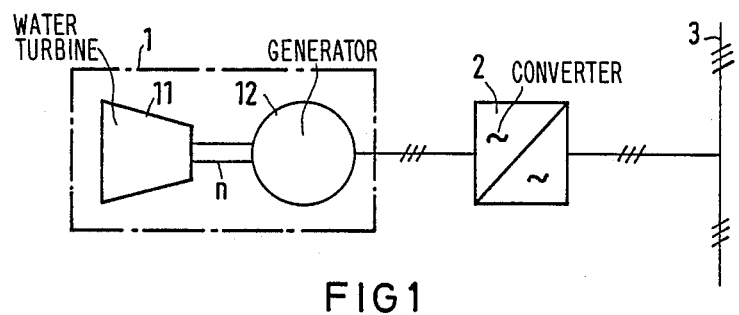
FIG. 1 shows a general block diagram of the machine set according to the invention.

A machine set 1 in accordance with this invention, as shown in FIG. 1, consists of a water turbine 11 with a generator 12 permanently coupled thereto. Both have the same speed n. There are no special requirements as to the type of turbine design and the type of generator. Thus, Pelton, propeller, Francis or Kaplan turbines can preferably be used depending on the hydraulic conditions. In the case of the propeller and Francis turbines, the vanes of the diffuser between the water inlet and the rotor, also called the guide vane wheels can be made adjustable. In a Pelton turbine, the adjustable nozzle orifice corresponds to the aperture of these guide wheel vanes. In the case of Kaplan turbines, the blades of the rotor can also be designed adjustably. In these cases, one speaks of turbines with "single control". If, in particular in Kaplan turbines, both groups of blades are designed adjustable, one speaks of "double control". The respective guide wheel or nozzle orifice $a_o$ and the aperture at the rotor blades $\Phi$ are the determining factors for the operational behavior of the turbine and are therefore essential parameters for their characteristic curves. If, depending on the type of design of the turbine, one or both characteristics are variable, they can be utilized as input signals for setting certain operating points.

A synchronous machine is preferably used as the generator 12. However, it is also conceivable to provide an asynchronous machine for this purpose. This generator feeds a network 3 of constant frequency via a converter 2, the frequency of which can be controlled. The converters can be intermediate-link converters or direct converters. A speed controller for the combination of converter/generator type is provided in the converter controller and generator excitation that might be provided in such a way that in principle any desired speed can be set for the machine set within the technology permissible limits.

Figure 2:
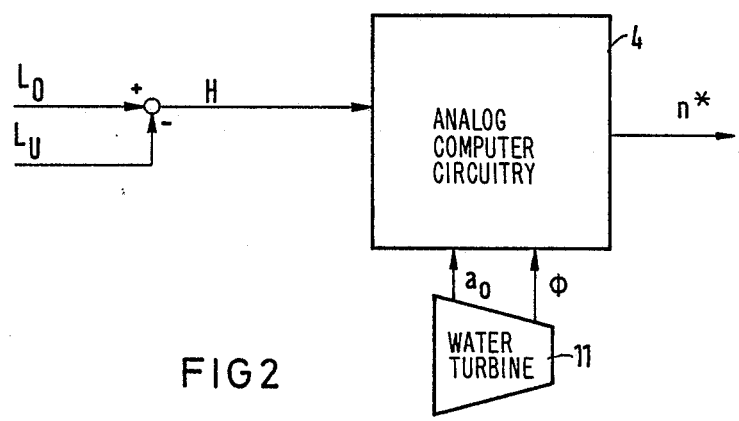
FIG. 2 shows a circuit diagram of the device according to the invention.

According to the invention, the reference value n* for this speed control is now preset in such a manner that the machine set is always operated at the efficiency optimum. For this purpose, means 4 are provided according to FIG. 2 which simulate turbine characteristics. For example, means 4 may comprise analog computer circuits. However, groups of values can also be stored digitally in suitable designed and organized storage memory units which image the ideal characteristics or response of the set point by point. By means of these so-called "shell diagrams" unique to the turbine used, the relationship between the optimum operating point and the corresponding speed reference value of the machine set is established. For finding this operating point, operational parameters as well as hydraulic parameters are utilized. More specifically, the operational parameters are the current values $a_o$ and $\Phi$ and the hydraulic parameter is the water drop H. The latter is obtained from the difference of the actual values of the upper and lower water levels ($L_o$–$L_u$). In this case it does not matter whether the turbine is "controlled", i.e., whether none of the two, one or both characteristics can be used as the control signal since in the range of the values of the present apertures, or orifices the most advantageous operating point in the form of the corresponding optimum speed reference value is always found.

Figure 3:
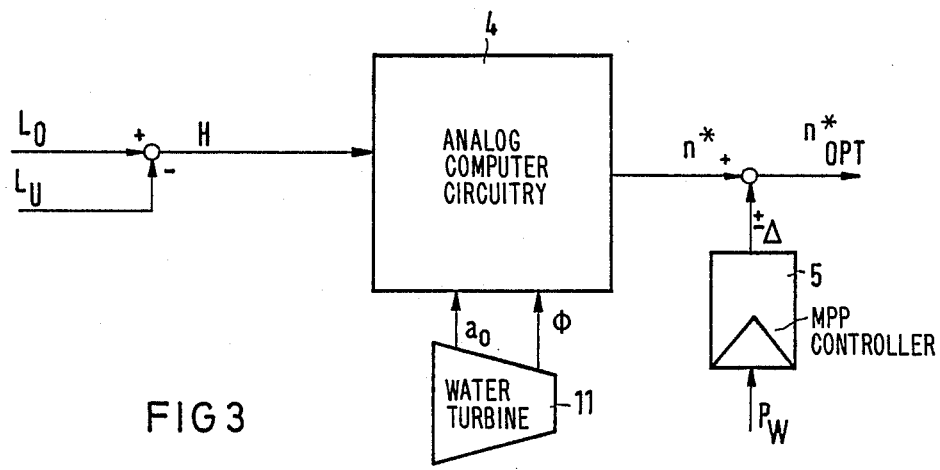
FIG. 3 shows a further embodiment of the invention with an additional MPP control.

In a further embodiment of the invention, it is advantageous to employ, according to FIG. 3, an additional maximum-power point controller (MPP controller) 5 for fine optimization. This MPP controller acts on the reference value n* found by the characteristic-simulating means 4 at the successive time intervals by operating correction values of small magnitude and suitable sign, called "incremental correction values" $\Delta$. The value $n_{opt}*$ formed in this manner now serves as the reference value proper for the speed control. The evaluation of the electrical active power delivered at the generator terminal makes it clear whether or not the incremental control intervention on the reference value n* has actually caused an increase of the delivered active power. Accordingly, the correction value $\Delta$ is increased by a further step in the following time interval or reduced. Under some conditions it may be of advantage to provide time averaging in the evaluation of the actual output power PW in order to attenuate the effect of the fluctuations, caused by the other reasons, of the actual power output Pw on the MPP controller.

The additional employment of the MPP controller has the advantage that possible inaccuracies contained in the turbine characteristics are equalized. In addition, almost unnoticeable shifts of the optimal operating point are taken into consideration automatically relative to the characteristics store in the controller means 4. Such shifts can be due to increasing wear of the system. As a result thereof, the MPP controller must add an amount of the correction value not vanishing in its time average, to the original optimum speed reference value in order to assure continued, approximately optimum operation of the machine set. This amount can be utilized for an evaluation of the aging of various elements of the set.

It is furthermore of particular advantage that the generator and the converter are included by the MPP controller in the optimization, since the actual power output Pw is determined on the network side. Thus, the MPP controller has an equalizing effect if the optimum operating point as determining by the ideal characteristic does not agree exactly with the point of maximum active power delivery to the network. In addition the MPP controller corrects changes in the flow behavior which could otherwise be taken into account only by installing additional measuring devices such as flow meters.

Figure 4:
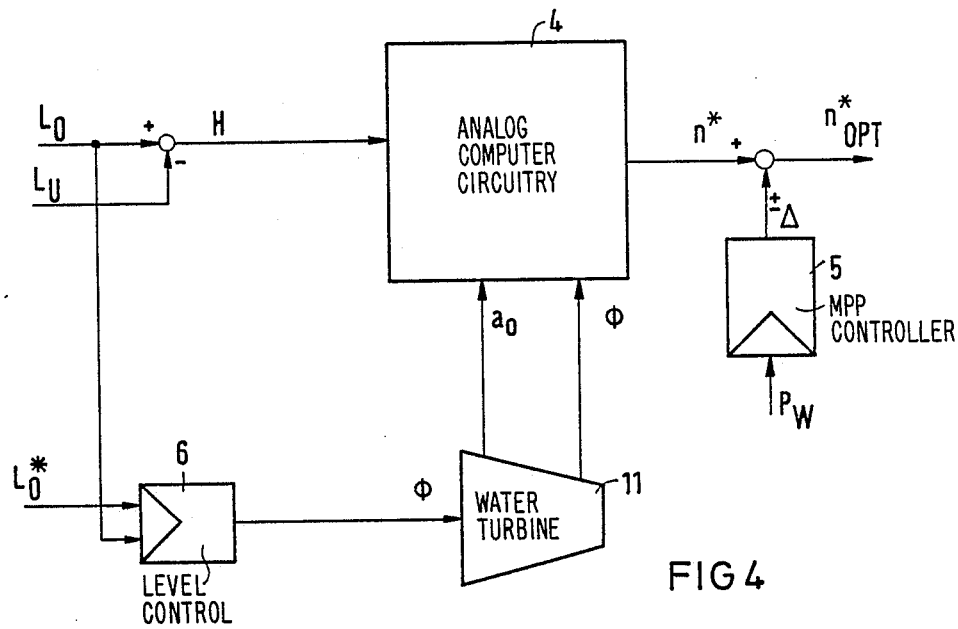
FIG. 4 shows another embodiment of the invention, with an additional level control where, for instance, the upper water level is set through a characteristic aperture at the rotor serving as the input signal.
Figure 5:
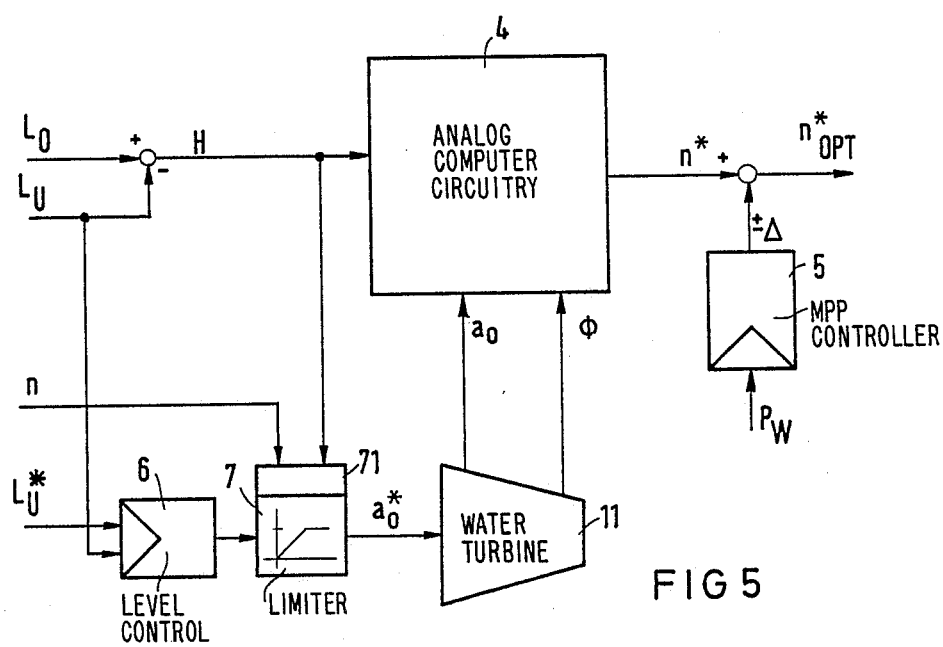
FIG. 5 shows a further embodiment of the invention, with additional limitation of the characteristic used for the level control where, for instance, the lower water level is adjusted via aperture at the guide vane of nozzle orifice, respectively.
Figure 6:
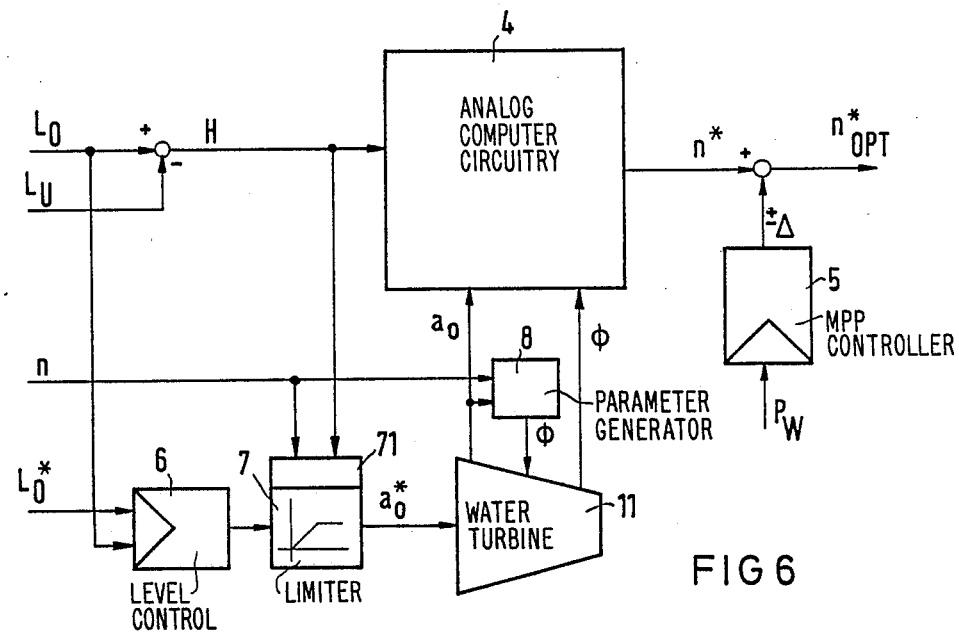
FIG. 6 shows a further embodiment of the invention as compared to FIG. 5, with additional limiting of the characteristic not used for the water level control, where, for instance, the upper water level is set via the aperture at the rotor or nozzle orifice.

In a further embodiment of the invention, it is advantageous if a single-or double-control turbine is present, to provide an additional level control 6 which is shown in FIGS. 4 to 7. With its aid, the upper water level $L_o$ can be set ahead of the turbines or the lower water level $L_u$ after the turbine in accordance with the desired reference value $L_o*$, $L_u*$. One of the two characteristic quantities $a_o$ and $\Phi$ serves here as the control signal. FIG. 4 shows as an example, an upper water level control by means of changing the rotor blade aperture via the characteristic parameter $\Phi$ defined above.

It is of particular advantage that the level control can be combined in a simple manner with the speed reference value for optimum efficiency according to the invention. In the case of river power stations, the upper and lower levels may not be selected at will due to the seasonal variations of the amount of water available and maintaining certain water levels, for instance, in view of navigation and recreational uses. For these conditions, the speed reference value setting, which is control parameter according to the invention, especially together with an MPP controller and another limitation for an additional level control, allow the maximum efficiency to be achieved within the limit given thereby. Consequently, the optimally possible active power is delivered by the machine set at any time.

In a further embodiment of the invention, the value of the characteristic not required for level control, if a double-control turbine is present, is slaved to the actual value of the parameter employed as the control signal for level control by means of a special characteristic generator as a function of the actual speed n of the machine set. Thereby, the relationship for optimum efficiency between the apertures of the two control organs of the turbine is adjusted and the amount of power of the machine set which can be delivered in a time average is increased further. Accordingly, the aperture at the rotor blades of the guide wheel or nozzle orifice a serving for controlling the upper water level $L_o$ is reset in the embodiment example of FIG. 6 by means of the parameter generator 8.

Finally, in a further embodiment of the invention, the occurrence of unpermissible operating conditions, for instance, due to cavitation is avoided by a limiter 7. The latter is shown in the embodiment example of FIG. 5, where the turbine 11 can be designed with single-or double-action control. A series-connected processing unit 31 generates as a function of the actual machine speed n and the drop H, the maximum aperture orifice permissible of the control element serving for the level control H. As is shown in the embodiment according to FIG. 5, the characteristic a is used there as a control signal for the aperture at the guide vane or nozzle orifice for controlling the lower water level $L_u$. The reference value $a_o$ delivered by the level control 6 is limited there in the manner just described by the limiter 7 in conjunction with a processing unit 71.

Figure 7:
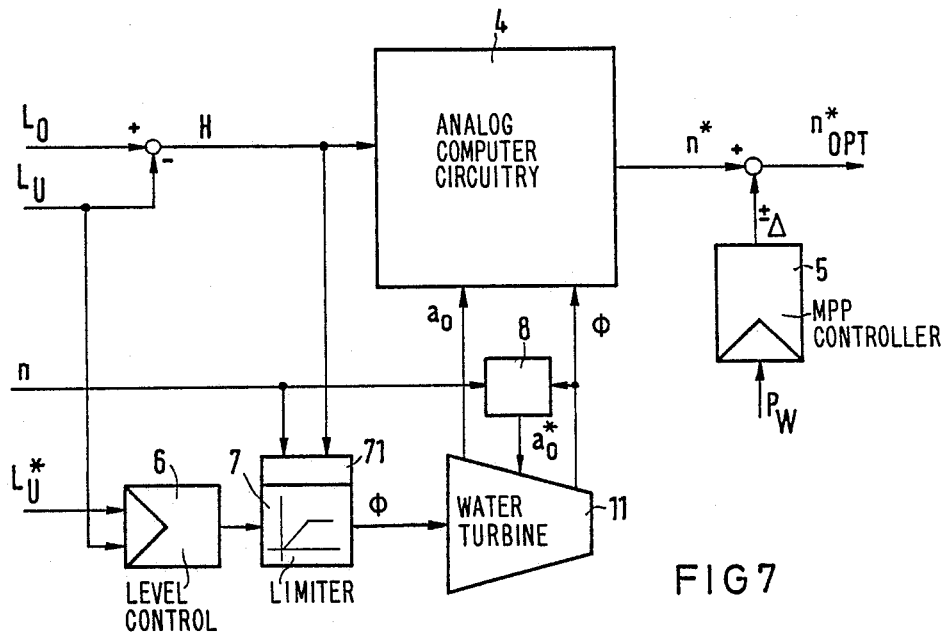
FIG. 7 shows another embodiment example where the rotor aperture is adjusted for controlling the lower water level and the aperture at the guide-vane or nozzle orifice.

In the final embodiment according to FIG. 7, the turbine is assumed to be double-action controlled. Besides the input, characteristic-controlled via the means 4, of the speed reference value n* and its fine optimization by means of the MPP control 5 to the reference value $n_{opt}*$, also the lower water level $L_u$ is brought to the desired reference value $L_u*$ by the control 6. This is accomplished by setting the parameter $\Phi*$ limited via the limiter 7 and the corresponding processing unit 71 as the control signal for the aperture at the rotor. Taking into consideration the actual speed n of the machine set, the second characteristic is readjusted $a_o$ via an additional parameter generator 8, as the control signal $a_o*$ for aperture at the guide vane or nozzle orifice with optimized efficiency.

The machine set 1 is consequently operated, according to the invention, at the instantaneously possible efficiency maximum at any time and therefore delivers the maximal possible active power to the network.

What claimed is:

1. A machine set comprising:
   a water turbine;
   a generator permanently coupled to the water turbine;
   a frequency controlled converter for feeding power from the generator to an electrical network; and
   control means which simulate turbine characteristics and preset a speed reference value as a function of an actual water drop and of turbine characteristics to adjust the speed of the machine set to provide optimum power at maximum efficiency, wherein said turbine characteristics include an aperture at the turbine guide wheels and the rotary blade group.

2. The machine set according to claim 1, further comprising a maximum-power point controller responsive to the actual generated value of the active power, for varying said speed reference value by successively adding incremental correction values until optimum active power is delivered to said network.

3. The machine set according to claim 1, wherein said turbine is a single-or-double-action controlled turbine, further comprising control device which presets one of said turbine characteristics for adjusting one of a desired upper or lower water level.

4. The machine set according to claim 3, further comprising a limiter which limits said one turbine characteristic quantity used for adjusting a desired upper or lower water level dependent on the actual values of the speed of the machine set and the water drop in such a manner that no unpermissible operating conditions occur.

5. The machine set according to claim 1 wherein said turbine is a double-action controlled turbine, further comprising:
   (a) a control device which presets one of said turbine characteristics for adjusting a desired upper or lower water level; and
   (b) a characteristic curve generator responsive to said one turbine characteristic preset by said control device and to the actual speed of the machine set, for slaving the other turbine characteristic to optimum efficiency of the machine set.

6. A machine set comprising:
   a water turbine;
   a generator permanently coupled to the water turbine;
   a frequency controlled converter for feeding power from the generator to an electrical network; and
   control means which simulate turbine characteristics and preset a speed reference value as a function of an actual water drop and of turbine characteristics to adjust the speed of the machine set to provide optimum power at maximum efficiency, wherein said turbine is a Pelton turbine and said characteristics include nozzle orifices and the aperture of the rotary blade group.

7. The machine set according to claim 6, further comprising a maximum-power point controller responsive to the actual generated value of the active power, for varying said speed reference value by successively adding incremental correction values until optimum active power is delivered to said network.

8. The machine set according to claim 6 wherein said turbine is a double-action controlled turbine, further comprising:
   (a) a control device which presets one of said turbine characteristics for adjusting a desired upper or lower water level; and
   (b) a characteristic curve generator, responsive to said one turbine characteristic preset by said control device and to the actual speed of the machine set, for slaving the other turbine characteristic to optimum efficiency of the machine set.

9. The machine set according to claim 6, wherein said turbine is a single-or-double-action controlled turbine, further comprising control device which presets one of said turbine characteristics for adjusting one of a desired upper or lower water level.

10. The machine set according to claim 9, further comprising a limiter which limits said one turbine characteristic quantity used for adjusting a desired upper or lower water level dependent on the actual values of the speed of the machine set and the water drop in such a manner that no unpermissible operating conditions occur.

* * * * *